United States Patent [19]

Spurling

[11] 4,209,315
[45] Jun. 24, 1980

[54] GLASS FORMING APPARATUS
[75] Inventor: J. Jeffrey Spurling, Horseheads, N.Y.
[73] Assignee: Corning Glass Works, Corning, N.Y.
[21] Appl. No.: 9,865
[22] Filed: Feb. 7, 1979
[51] Int. Cl.² ............................................. C03B 17/00
[52] U.S. Cl. ......................................... 65/145; 65/327
[58] Field of Search ................. 65/145, 199, 121, 128, 65/327

[56] References Cited
U.S. PATENT DOCUMENTS

| | | | |
|---|---|---|---|
| 1,734,964 | 11/1929 | Danner | 65/121 X |
| 1,734,965 | 11/1929 | Danner | 65/195 |
| 1,844,049 | 2/1932 | Spinasse | 65/199 |
| 3,192,023 | 6/1965 | Stalego | 65/121 X |
| 3,218,143 | 11/1965 | De Lajarte | 65/121 X |
| 3,345,150 | 10/1967 | Ihrig | 65/199 X |
| 3,582,306 | 6/1971 | Giffen | 65/145 X |
| 3,589,887 | 6/1971 | Ward | 65/199 X |
| 3,622,298 | 11/1971 | Machian et al. | 65/199 X |

Primary Examiner—Richard V. Fisher
Attorney, Agent, or Firm—John P. DeLuca; Burton R. Turner

[57] ABSTRACT

In an apparatus for forming multiple ply sheet glass directly from separate sources of molten vitreous material while maintaining such separate sources free from exposure to detrimental gaseous media during the formation of such sheet glass; metering means in communication with each of said separate sources of vitreous material, a pair of opposed surface portions thereof defining a central longitudinal delivery passage for delivering molten glass from one source of vitreous material, and a pair of opposed channels for delivering molten glass from the other source, insert means adapted to mate with the metering means in said delivery passage for reducing the flow of molten glass therethrough to provide sheet glass having a width narrower than the width of said delivery passage.

12 Claims, 7 Drawing Figures

GLASS FORMING APPARATUS

BACKGROUND OF THE INVENTION

The formation of multiple-layer sheet glass has been known in the prior art. Danner U.S. Pat. No. 1,734,965 discloses method and apparatus for forming composite sheet glass by flowing separate sources downwardly along forming members and then uniting the films formed on each member into a composite sheet. It was not only difficult to maintain uniform thicknesses across the films with this method, but also the surfaces of both the core glass and outer film glass were exposed to atmosphere before they were united, thus detrimentally affecting the resulting bond between adjacent layers of glass.

In a like manner, the De Lajarte U.S. Pat. No. 3,218,143 discloses an updraw process for the manufacture of laminated flat glass. However, here again it is difficult to control the thickness uniformity of the applied glass layers relative to the interlayer, particularly where it is desired to produce sheet glass with a defined core thickness encased in a relatively thin skin glass.

Various feeders were also known in the prior art for forming composite glass articles, such as fibers, as shown in Stalego U.S. Pat. No. 3,192,023. Such feeders, however, did not provide for glass distribution and control which is necessary to form a composite sheet of glass with uniform layers or stratums. In addition the streams did not unite within a confined space removed from atmospheric attack, which is necessary to achieve ultimate strength and durability in the composite sheet.

In the Giffen U.S. Pat. No. 3,582,306, of which the present disclosure is an improvement, a novel method of forming a composite sheet or ribbon of glass directly from plural sources of molten glass was described. A wedge shaped central container having a discharge slot or port formed by a pair of metering units communicably unite the lower portions of the central container and an outer chamber and define a confined width or thickness of the discharge slot from which united pairs of glass emanate as a composite sheet prior to atmospheric exposure. No means of adjustment was provided in the aforementioned Giffen patent and thus modification of the width of the ribbon so obtained required a refabrication of the system.

SUMMARY OF THE INVENTION

In an apparatus for forming multiple ply sheet glass directly from separate sources of molten vitreous material while maintaining such separate sources free from exposure to detrimental gaseous media during the formation of such sheet glass; metering means in communication with each of said separate sources of vitreous material, a pair of opposed surface portions thereof defining a central longitudinal delivery passage for delivering molten glass from one source of vitreous material, and a pair of opposed channels for delivering molten glass from the other source, insert means adapted to mate with the metering means in said delivery passage for reducing the flow of molten glass therethrough to provide sheet glass having a width narrower than the width of said delivery passage.

DESCRIPTION OF THE PREFERRED EMBODIMENTS

Figure 1:
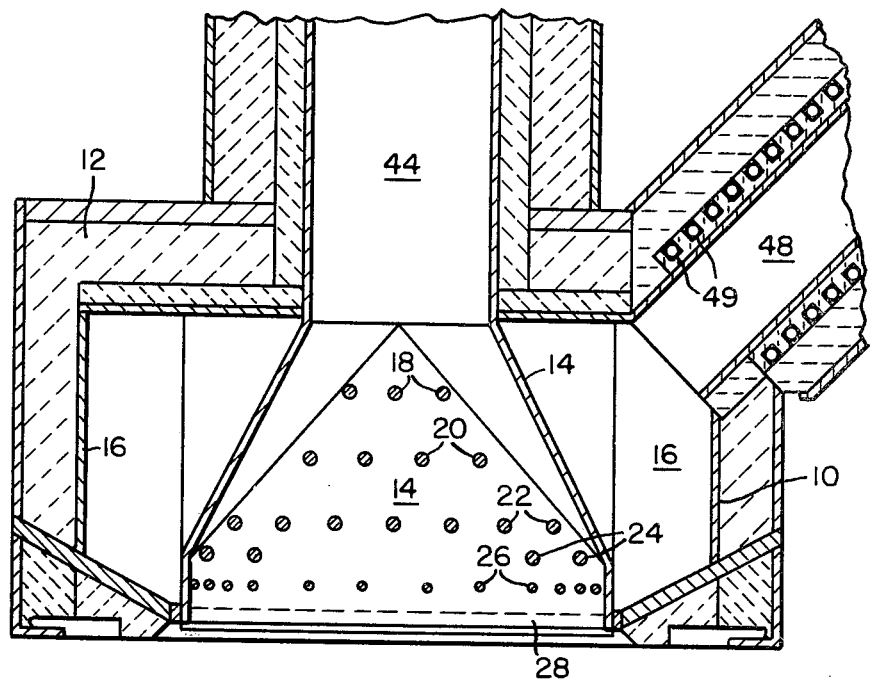
FIG. 1 is a side elevational view in section of a prior art feeder assembly embodying the present invention.
Figure 3:
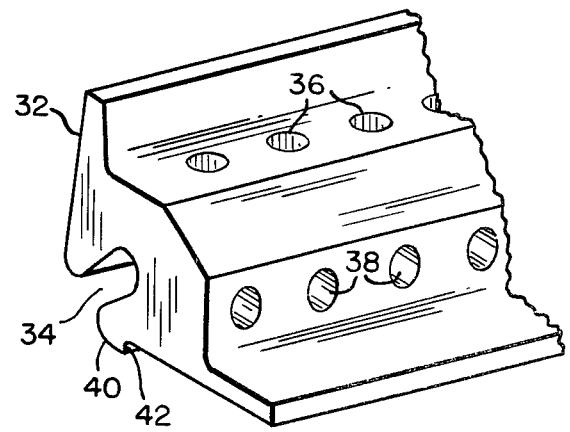
FIG. 3 is an enlarged perspective fragmental view of a metering unit shown in FIGS. 1 and 2.
Figure 2:
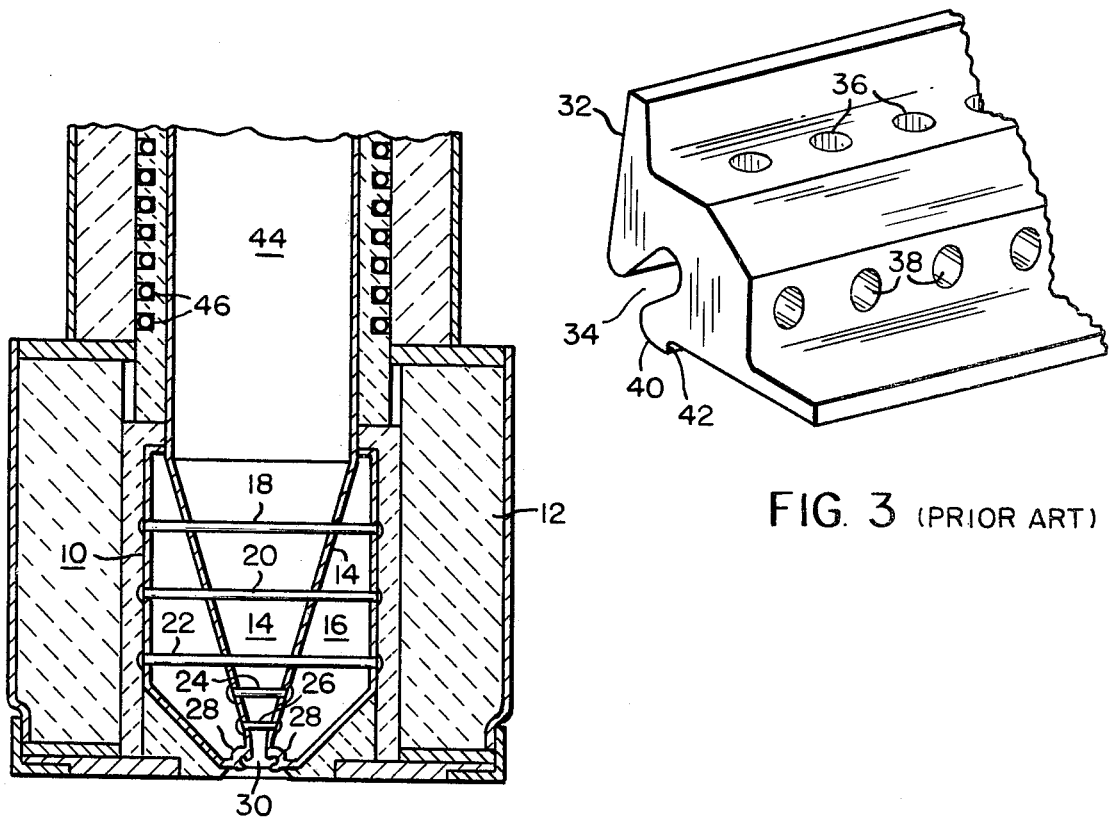
FIG. 2 is an end elevational view in section of the feeder shown in FIG. 1.

Referring now to the drawings, a feeder assembly 10, from Giffen U.S. Pat. No. 3,582,306, is shown encased within a refractory housing 12. The assembly 10 includes a wedgeshaped central container 14 surrounded by an outer chamber or container 16. The central container 14 retains a supply of molten glass which will form the center or core of a laminated sheet, whereas the outer chamber 16 retains molten glass which will serve as an overlay or skin glass for the core glass. A plurality of rows of strengthening and distributor bars 18, 20 and 22 extend through the central container 14 and across the outer chamber 16 to not only add structural stability to the assembly 10, but also provide a degree of impedance to the glass flow so as to more uniformly distribute it for delivery. In addition, strengthening and distributor bars or rods 24,26 extend across the lower portion of central container 14 to both maintain the integrity of the container under the hydraulic head produced by dynamic flow conditions and provide the necessary impedance to flow at the lower end of container 14 so as to distribute the core glass along the delivery passage in such a manner to produce sheet glass of uniform thickness. As will be observed, rods 26 are relatively closely spaced adjacent edge portions of the delivery area in order that sufficient impedance to glass flow is attained in such regions to minimize thickening of the lateral edge portions of sheet formed by the assembly 10.

The lower ends of container 14 and chamber 16 are in communication with one another by means of metering units 28 which physically connect the two containers together, such as by welding. The metering units 28 also form a confined slotted delivery passage 30 wherein the separate glass sources are united in sheet form before being discharged from the assembly. Opposed surfaces 32 of metering units 28 form a delivery slot for the core glass supplied by central container 14. A longitudinally-extending delivery channel 34, opening into delivery passage 30, is formed in each unit 28.

A plurality of metering passages 36, 38 extend through units 28 between the chamber 16 and delivery channel 34. As shown, the passages 38 are longitudinally offset with respect to passages 36 so that the streams of glass entering channels 34 are broken up to prevent patterns or streaks in the sheet issuing from the channels. The size and number of metering passages 36,38 are chosen to afford maximum impedance to the flow entering the channel 34 and thereby reduce the flow impedance necessitated by the channel walls to control flow rate. Accordingly, this reduces to a minimum the dependence upon a uniform channel opening to maintain a desired rate of glass flow therefrom.

The discharge opening of channel 34 is recessed from surface 32 so as to facilitate the flow of molten glass from chamber 16 in sheet form contiguous with the flow of core glass emanating from between surfaces 32. The lower region of surface 32, over which the glass issues from container 14, and the lower lip of channel 34, over which the glass issues from chamber 16, are both provided with massive longwearing delivery surfaces. In addition, the lower surface 40 of each metering unit 28 is provided with a recess or stepped edge 42 to produce a defined delivery of the glass sheet from the assembly and prevent a wetting thereof by the molten glass.

A vertically projected tubular member 44, having suitable heating elements 46, is utilized to feed molten glass to wedge-shaped container 14, whereas a tubular structure 48 having heating elements 49 is connected to a suitable source of molten glass for supplying glass to outer chamber 16.

The feeder assembly is preferably made of platinum or platinum-rhodium alloy, and is adapted to be electrically heated to maintain molten glass within the separate chambers at suitable fluidities, in a known manner.

Figure 4:
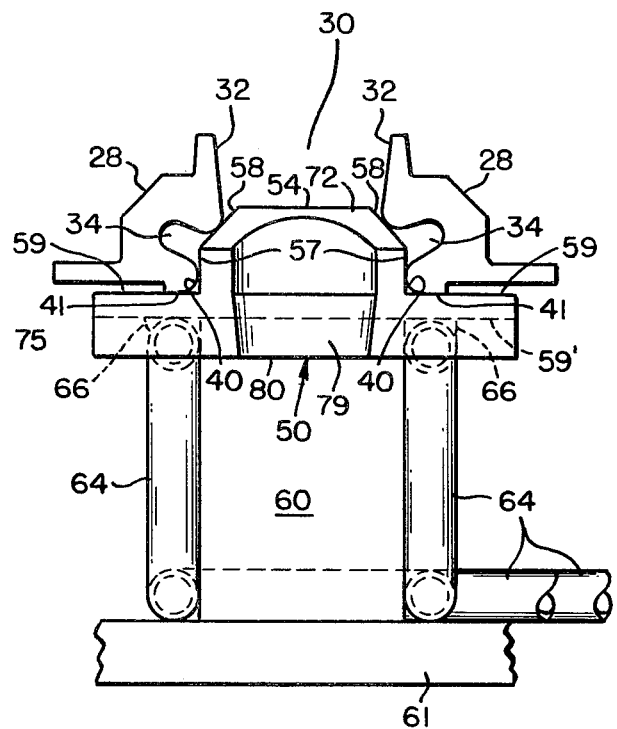
FIG. 4 is an enlarged side elevation of an insert according to the present invention located in the delivery channel.

In FIG. 4 there is illustrated the improvement provided in the present invention. An orifice adjustment means or insert 50 is located between the opposing pair of metering units 28. It is the intention of the present invention that in one embodiment at least one insert 50 will be located at one of opposite ends 52 of the metering units 28. For example, see FIG. 5, where portions of the container 14 are shown with insert 50 located therein at one end 52, the other end could be fitted with another insert having a profile which is a mirror image of that shown. An insert 50 installed at only one end 52 would require less set up time. Furthermore one insert having opposed ends similar to free end 70, detailed below, could be located centrally of the delivery passage 30 and thus provide two, longitudinally separated streams of glass.

Figure 5:
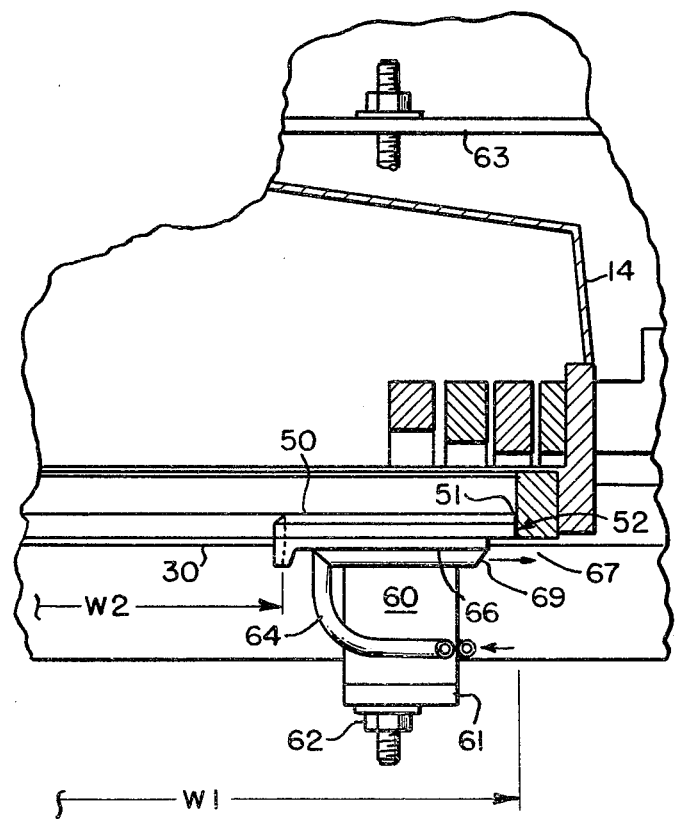
FIG. 5 is a side sectional view of the insert in the delivery channel.

The opposed surfaces 32 of the metering unit 28 form the slotted delivery passage 30 as mentioned above. The insert 50 has an upper face 54 which enters between a lower end of opposed surfaces 32 and thus blocks the delivery passage 30. Similarly adjacently located obliquely oriented faces 58 of the insert 50 block delivery channels 34. Thus neither core glass nor skin glass can flow through the delivery passage 30 and delivery channels 34 in the vicinity of the insert 50. In FIG. 5 the dimension W1 represents the full width (fragmented) of the delivery passage 30 whereas the dimension W2 represents the modified or shortened width thereof upon installation of the insert 50. Likewise two streams of glass could be formed of varying the dimensional width if an insert 50 is centrally located.

A supporting block 60 secured to insert 50 at weld 51 is mounted to a cross member 61 which, in turn, is secured by bolts 62 (only one shown) to a frame member 63. Air lines 64 are each located below and are welded to underside 59' of a flange member 75 integral with the insert 50 along respective beads 66. Two of such air lines 64 are shown in FIGS. 4 and 5. The purpose of the air lines 64 is to provide a passageway for cooling air so that the insert 50 can be sufficiently cool to freeze glass at the various interfaces between insert 50 and delivery channel 30. For example glass could flow through the delivery passage 30 along surfaces 58 and meet with skin glass exiting the delivery channel 34, and thence along a vertical edge 57 of the insert interfacing with lower surface 40 of each metering unit 28. Glass could then flow around the lower surface 40 and seep through a space 41 interfacing with a horizontal surface 59 of the insert 50. If the insert is located in mating relation with lateral end 52 of delivery passage 30, glass could likewise seep past an extreme lateral end 51 of the insert 50 mating with the corresponding end 52 of the channel 30. Thus an open chamber area 67 just below the end 51 of the insert 50 is cooled by air exiting open end 69 of the air lines 64. Note the direction of the arrows in FIG. 6. The surfaces described above which mate with corresponding portions of delivery channel 30 are relatively close in tolerance to provide an effective mating seal when cooled.

The insert 50 has a profile adapted to mate with the delivery channel 30 as described in FIG. 4 including surfaces 54 and 58 for mating with the appropriate portions of said delivery passage 30 and delivery channels 34 respectively, and end 51 mating with corresponding rounded end portion 52 thereof.

Figure 6:
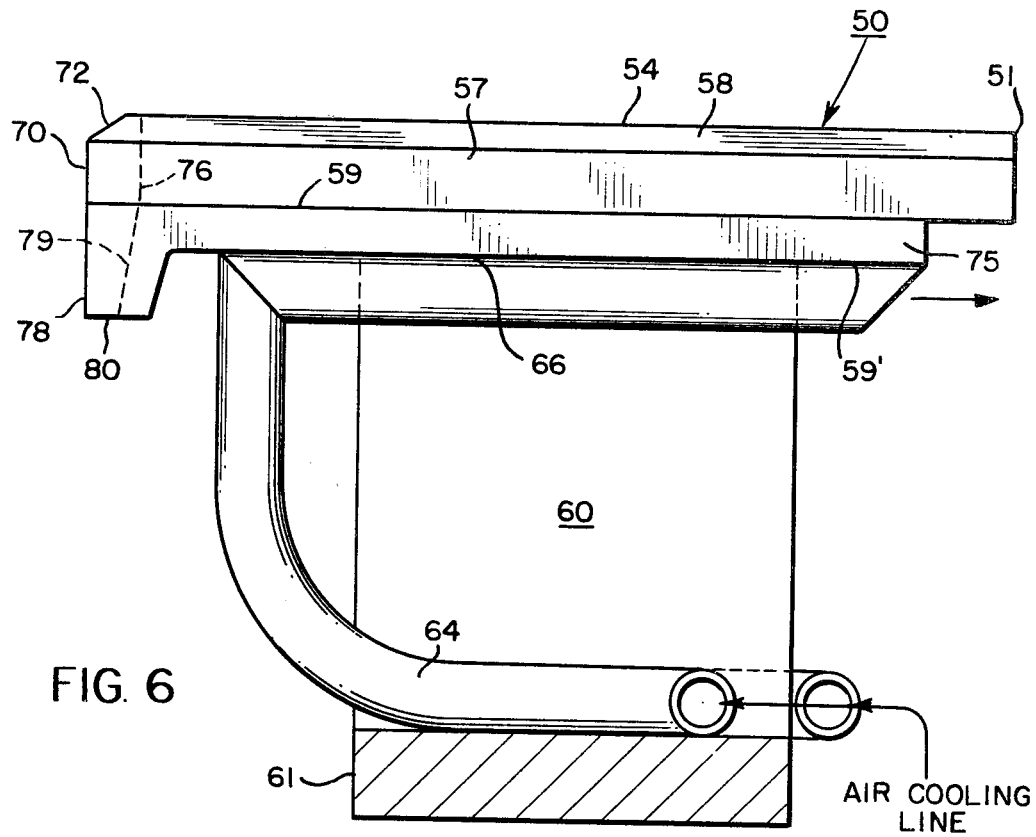
FIGS. 6 and 7 are side elevation and top plan views, respectively, of the invention according to the present invention.
Figure 7:
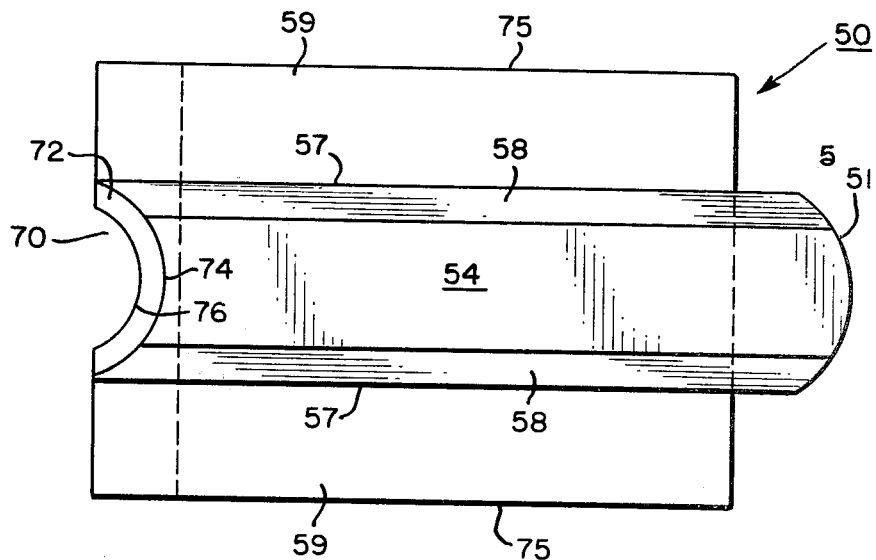

Referring now to FIG. 7, and portions of FIG. 6, free end 70 of insert 50 is shown having a glass forming surface 72 which tapers from a large radius 74 to a smaller radius 76. This glass forming surface 72 is a section of a cone and helps to form a lateral margin of the glass ribbon passing through the outlet slot 30 in such a way as to be similar in characteristics to that formed by the end 52 of the previously described prior art delivery slot 30. A drip edge 78 meeting with small radius 76 extends downwardly from glass forming surface 72 and thence tapers inwardly along surface 79 to urge glass emanating from delivery channel 30 inwardly thereof. Thus glass buildup may be prevented along lower extent 80 of the drip edge 78. If the insert is centrally located, the profile of free end 70 could be duplicated in mirror image of that shown to effect the glass forming and drip edge functions described for a second sheet of glass. Normally the insert 50 is formed to mate with the lateral end 52 of delivery channel 30 and it will have its lateral end 51 formed with the cylindrical profile thereof.

The present invention is adapted and designed for easy removal or insertion into the delivery passage 30 and thus major modification of the prior art device is unnecessary when utilizing the principles of the present invention to regulate the width or opening of delivery channel 30.

While there have been provided what are believed to be the preferred embodiments of the present invention, it will be obvious to those skilled in the art that various changes and modifications may be made therein without departing from the invention, and it is thus intended in the appended claims, to cover all such changes and modifications which fall within the true spirit and scope of the invention.

I claim:

1. In an apparatus for forming multiple ply sheet glass directly from separate sources of molten vitreous material while maintaining such separate sources free from exposure to detrimental gaseous media during the formation of such sheet glass, metering means in communication with each of said separate sources of vitreous material including; a pair of opposed surface portions defining a central longitudinal delivery passage for delivering therefrom molten glass from one source of vitreous material, and a pair of opposed channels therein for delivering molten glass from the other source, the improvement comprising: at least one insert means adapted to mate with the metering means in said delivery passage and opposed channels for reducing the flow of molten glass therethrough when located in mating relation therewith to provide sheet glass having a width narrower than the width of said delivery passage.

2. Apparatus according to claim 1 wherein said insert includes an upper surface adapted to mate with said central longitudinal delivery passage, and obliquely opposed adjacent surfaces substantially coextensive therewith for mating with said opposed channels.

3. Apparatus according to claim 2 including; opposed surfaces joining with said oblique surfaces and projecting downwardly therefrom and opposed surfaces at a lower extent thereof lying perpendicular to said downwardly projecting surfaces extending beyond said delivery passage for forming an interface with said metering means in close tolerance and in mating relation therewith.

4. Apparatus according to claim 1 further including; means for carrying cooling fluid attached to said insert for lowering the temperature thereof.

5. Apparatus according to claim 4 wherein said means for carrying cooling fluid comprises; at least one pipe in thermal communication with said insert and adapted at one end to be coupled to the source of cooling fluid and open at its other end for delivering said cooling fluid to space adjacent an end portion of said insert.

6. Apparatus according to claim 1 wherein said insert includes; a glass forming surface located at, at least one free end thereof and adapted to be in contact with glass emanating from said delivery passage, said glass forming surface tapering as a conic section from said upper surface toward said adjacent surfaces from a larger radius to a smaller radius.

7. Apparatus according to claim 6 wherein said glass forming surface further includes; a downwardly projecting drip edge extending from said smaller radius and inwardly of said delivery channel for urging glass in contact therewith inwardly thereof for preventing glass buildup at said free end of the insert.

8. Apparatus according to claim 6 wherein glass forming surfaces are formed in mirror image of each other at opposite free ends thereof.

9. Apparatus according to claim 1 further including; support means adapted to be attached to a lower portion of said insert for securing same in mating relationship with said delivery channel.

10. Apparatus according to claim 1 wherein said insert includes a lateral end adapted to mate with a corresponding lateral end of said delivery channel.

11. Apparatus according to claim 10 wherein said lateral end of the insert is a cylindrical section axially perpendicular to the delivery channel.

12. Apparatus according to claim 1 wherein at least one insert is located in said delivery channel to form at least one sheet of the narrower width sheet glass.

* * * * *